United States Patent
Lin et al.

(10) Patent No.: US 9,887,720 B2
(45) Date of Patent: Feb. 6, 2018

(54) FRONT-END CIRCUIT FOR WIRELESS COMMUNICATION SYSTEM AND WIRELESS COMMUNICATION SYSTEM THEREOF

(71) Applicant: Realtek Semiconductor Corp., HsinChu (TW)

(72) Inventors: Chung-Yo Lin, Tainan (TW); Kuan-Yu Shih, New Taipei (TW); Hsuan-Yi Su, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 14/691,567

(22) Filed: Apr. 20, 2015

(65) Prior Publication Data

US 2016/0119974 A1 Apr. 28, 2016

(30) Foreign Application Priority Data

Oct. 28, 2014 (TW) .............................. 103137262 A

(51) Int. Cl.
H04B 1/44 (2006.01)
H04B 1/18 (2006.01)

(52) U.S. Cl.
CPC ...................... *H04B 1/18* (2013.01)

(58) Field of Classification Search
CPC ....................................................... H04B 1/44
See application file for complete search history.

(56) References Cited

U.S. PATENT DOCUMENTS

| | | | | |
|---|---|---|---|---|
| 5,355,524 A * | 10/1994 | Higgins, Jr. | ............. | H04B 1/30 333/204 |
| 6,392,486 B1 * | 5/2002 | Lemay, Jr. | .............. | H03F 3/193 330/253 |
| 6,597,325 B2 * | 7/2003 | Judd | ...................... | H01Q 1/246 343/853 |
| 7,561,854 B2 * | 7/2009 | Manicone | ................ | H04B 1/52 455/127.1 |
| 2005/0227631 A1 * | 10/2005 | Robinett | ................ | H04B 1/006 455/83 |
| 2007/0018895 A1 | 1/2007 | Bolin | | |
| 2009/0115549 A1 | 5/2009 | Lee | | |
| 2013/0009704 A1 | 1/2013 | Liao | | |

(Continued)

FOREIGN PATENT DOCUMENTS

CN 1792041 A 6/2006
CN 102347780 A 2/2012
CN 103716062 A 4/2014

*Primary Examiner* — Vladimir Magloire
*Assistant Examiner* — Majid Syed
(74) *Attorney, Agent, or Firm* — Winston Hsu

(57) ABSTRACT

A front-end circuit for a wireless communication system includes a first amplifier, a second amplifier and an antenna switch. The first amplifier is disposed at a receiving path, wherein the first amplifier has an input terminal and an output terminal, and the input terminal of the first amplifier is coupled to a first pad. The second amplifier is disposed at a transmission path, wherein the second amplifier has an input terminal and an output terminal, and the output terminal of the second amplifier is coupled to a second pad different from the first pad. The antenna switch is coupled between the input terminal of the first amplifier and the output terminal of the second amplifier.

9 Claims, 4 Drawing Sheets

(56) References Cited

U.S. PATENT DOCUMENTS

| | | | |
|---|---|---|---|
| 2014/0087671 A1* | 3/2014 | Mostov | H03F 1/0227 455/78 |
| 2015/0288059 A1* | 10/2015 | Zuniga | H01Q 1/38 343/700 MS |
| 2016/0036392 A1* | 2/2016 | Bohsali | H03F 1/26 375/340 |

* cited by examiner

FRONT-END CIRCUIT FOR WIRELESS COMMUNICATION SYSTEM AND WIRELESS COMMUNICATION SYSTEM THEREOF

BACKGROUND OF THE INVENTION

1. Field of the Invention

The disclosed embodiments of the invention relate to wireless communication systems, and more particularly, to a front-end circuit for a wireless communication system that is compatible with both single and multiple antenna configurations, and wireless communication systems thereof.

2. Description of the Prior Art

In the wireless communications field, antenna configuration is a critical issue when constructing circuit architecture inside a chip based on system specifications. If the wireless communication specification only employs a single antenna shared by a transmission end and a receiving end, then an antenna switch will be required to separate a transmission amplifier and a receiving amplifier; if the wireless communication specification only employs two or more antennae wherein both a transmission end and a receiving end have their own dedicated antenna, then an antenna switch will not be required.

In order to save hardware production cost, the two architectures described above may be combined. FIG. 1 is a diagram illustrating a conventional dual-mode architecture configured in a first setting for a wireless communication system. Two low noise amplifiers (LNA) 102 and 104 are included in a dual-mode wireless front-end path 100 of a chip. The LNA 102 and 104 are coupled to a mixer 108. When adopting the single antenna mode, the LNA 104 will be disabled or left idle, and the LNA 102 and a power amplifier (PA) 106 will share an antenna 120 disposed outside of the chip. FIG. 2 is a diagram illustrating the conventional dual-mode architecture configured in a second setting for a wireless communication system. Another antenna 130 outside of the chip is used to receive data for the LNA 104. The antenna 120 is dedicated to transmit data for the LNA 106, and the LNA 102 is blocked from the antenna 120. For instance, an antenna switch inside the LNA 102 can separate a path between the LNA 102 and the antenna 120. Since the PA 106 can utilize the antenna 120 exclusively in this setting, another external power amplifier 122 may be employed to enhance signal power before the antenna 120.

The dual-mode wireless front-end path 100 can achieve divergent antenna configurations, but it needs to duplicate another LNA. In light of the above, the conventional architecture has to be refined, in terms of chip size and hardware cost.

SUMMARY OF THE INVENTION

One of the objectives of the invention is to provide a front-end circuit for a wireless communication system that is compatible with single/multiple antenna configurations, and wireless communication systems thereof, to solve the above issues.

According to a first aspect of the invention, a front-end circuit for a wireless communication system is disclosed. The front-end circuit comprises a first amplifier, a second amplifier and an antenna switch. The first amplifier is disposed at a receiving path, wherein the first amplifier has an input terminal and an output terminal, and the input terminal of the first amplifier is coupled to a first pad. The second amplifier is disposed at a transmission path, wherein the second amplifier has an input terminal and an output terminal, and the output terminal of the second amplifier is coupled to a second pad different from the first pad. The antenna switch is coupled between the input terminal of the first amplifier and the output terminal of the second amplifier.

According to a second aspect of the invention, a wireless communication system is disclosed. The wireless communication system comprises the aforementioned front-end circuit and an external antenna. The front-end circuit is integrated in a chip and operates at the single antenna mode. The external antenna is disposed outside of the chip and coupled to the second pad of the front-end circuit.

According to a third aspect of the invention, a wireless communication system is disclosed. The wireless communication system comprises the aforementioned front-end circuit, an external receiving antenna and an external transmission antenna. The front-end circuit is integrated in a chip and operates at the single antenna mode. The external receiving antenna is disposed outside of the chip and coupled to the first pad of the front-end circuit. The external transmission antenna is integrated in the chip and coupled to the second pad of the front-end circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 3:
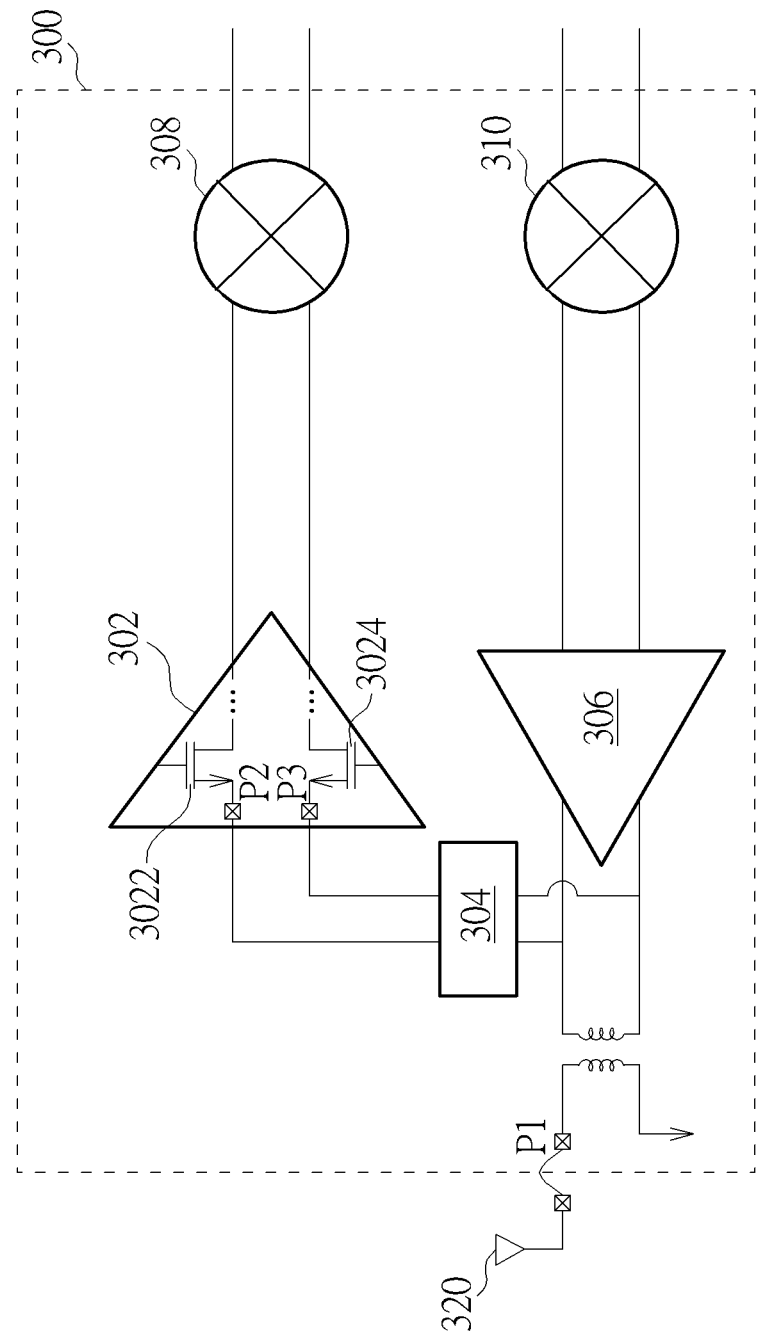
FIG. 3 is a diagram illustrating a front-end circuit in a first setting for a wireless communication system according to an exemplary embodiment of the present invention.

FIG. 3 is a diagram illustrating a front-end circuit in a first setting for a wireless communication system. The front-end circuit 300 is disposed in a wireless communication system chip, and an antenna 320 is disposed externally to the wireless communication system chip. The antenna 320 may be disposed on a printed circuit board (PCB) on which the wireless communication system chip is disposed. The antenna 320 and the wireless communication system chip may communicate to each other by wires on the PCB. The wireless communication system chip may include other transmission/receiving modules, such as a filter, a digital to analog converter, an analog to digital converter, and a baseband circuit, but this is not a limitation of the invention. Please note that FIG. 3 only depicts essential components that are particularly related to the invention. In FIG. 3, because the antenna 320 is the only antenna employed, an LNA 302 and a PA module 306 of the front-end circuit 300 are both coupled to the antenna 320 outside of the wireless communication system chip via a pad P1. When the system is receiving data, the PA module 306 is turned off and the antenna switch 304 is switched on. It should be noted that the switch 304 may include a matching circuit for appropriately matching impedance. In this way, the LNA 302 can obtain the received data without too much loss. A mixer 308 then unloads data from the high frequency carrier. When the system is transmitting data, the PA module 306 is turned on and the antenna switch 304 is switched off to separate the LNA 302 and the antenna 320. The data to be transmitted is then put to a high frequency carrier by a mixer 310 and sent to the antenna 320 via the PA module 306, wherein another matching circuit may be included between the front-end circuit 300 and the antenna 320.

In addition, the switch 304 may be a switch or a matching network or both the switch and the matching network. When emitting signals, the LNA 302 is turned off and the switch 304 can be turned off if the switch 304 is a switch. When the signals emitted from the PA module 306 do not have high signal strength, the switch 304 does not have to include a switching circuit for protecting Rx.

Figure 1:
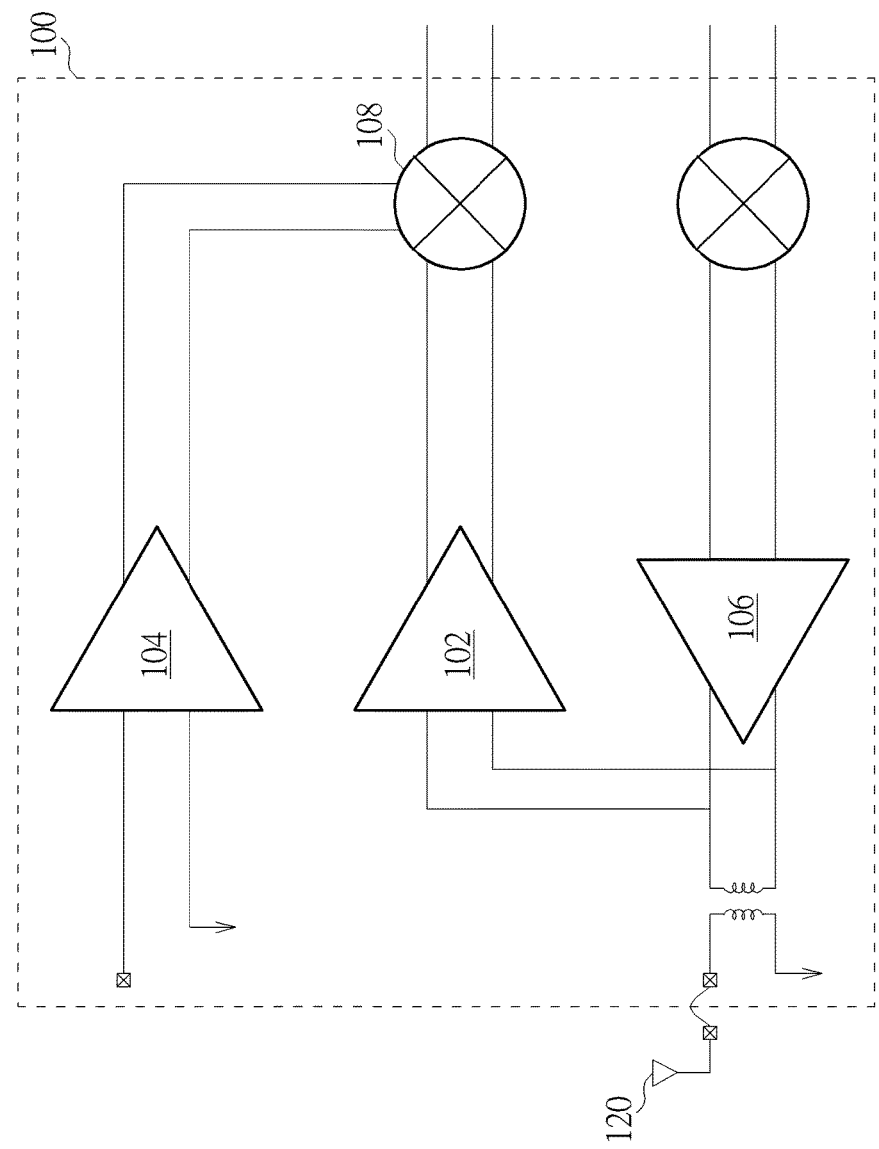
FIG. 1 is a diagram illustrating a conventional dual-mode architecture configured in a first setting for a wireless communication system.
Figure 2:
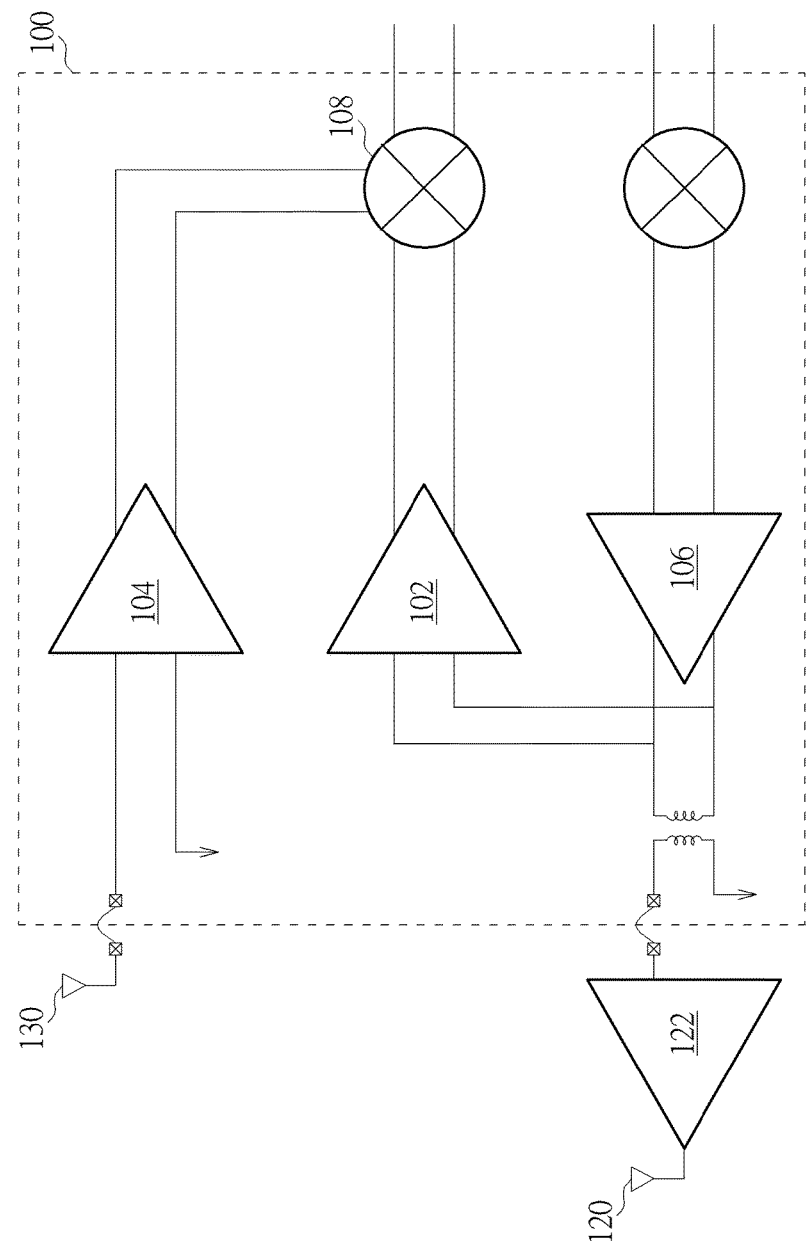
FIG. 2 is a diagram illustrating the conventional dual-mode architecture configured in a second setting for a wireless communication system.

Compared with the dual-mode wireless front-end path 100 of FIG. 1 and FIG. 2, the front-end circuit 300 only includes an LNA module 302; this is the essential concept of the invention. Consequently, the LNA module 302 of the front-end circuit 300 is implemented by a common-gate LNA (CGLNA), having feed points on source terminals of a differential transistor pair including transistors 3022 and 3024. The feed points are coupled to pad P2 and P3, respectively. By looking into the feed points from the outside of the chip, an equivalent shunt RLC circuit can be obtained. This is advantageous since, when the LNA module 302 is coupled to the external antenna via the pads P2 and P3 (i.e. the following second setting), a comparative wider impedance matching range and higher receiving reliability will be obtained.

Figure 4:
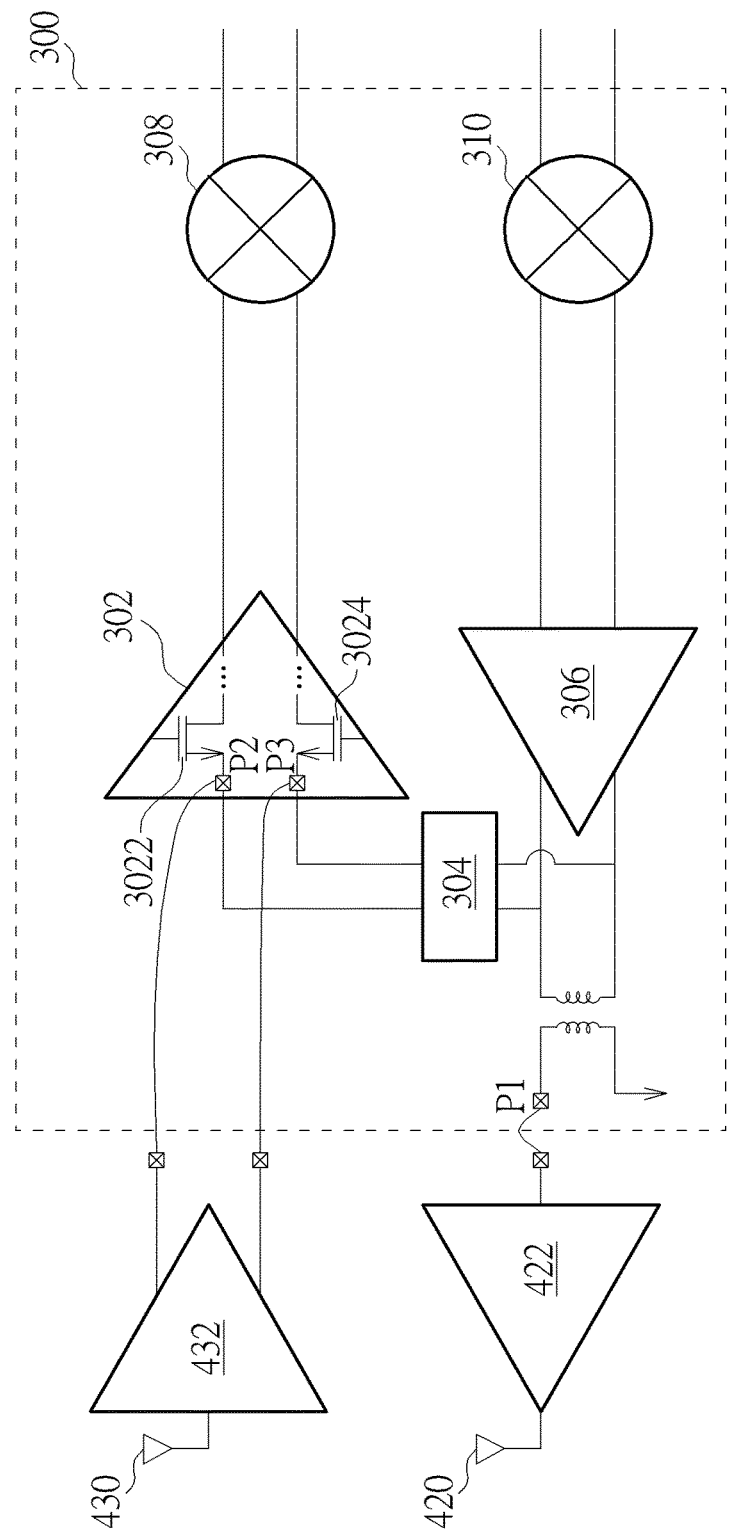
FIG. 4 is a diagram illustrating a front-end circuit in a second setting for a wireless communication system according to an exemplary embodiment of the present invention.

FIG. 4 is a diagram illustrating a front-end circuit in a second setting for a wireless communication system. Please note that FIG. 3 and FIG. 4 include the same front-end circuit 300; the difference between them is the external system configuration outside of the wireless communication system chip. An antenna 420 is disposed outside of the wireless communication system chip, and is dedicated for the PA module 306 of the front-end circuit 300; another antenna 430 is disposed outside of the wireless communication system chip, and is dedicated for the LNA 302 of the front-end circuit 300. A PA 422 and/or a matching circuit may be further adopted and disposed between the antenna 420 and the wireless communication system chip; an LNA 432 and/or another matching circuit may be further adopted and disposed between the antenna 430 and the wireless communication system chip. The optional PA 422 and the LNA 432 can enhance the transmission and receiving performance, but this is not a limitation of the invention.

Specifically, the LNA module 302 of the front-end circuit 300 is coupled to the LNA 432 outside of the wireless communication system chip via the pads P2 and P3; the PA module 306 of the front-end circuit 300 is coupled to the PA 422 outside of the wireless communication system chip via the pad P1. Because the LNA module 302 and the PA module 306 both have an exclusive antenna, the antenna switch 304 can remain switched off to separate the LNA module 302 and the antenna 420. In addition, the LNA 302 can be turned off if the switch 304 is only a matching network.

The front-end circuit for a wireless communication system, compatible with single/multiple antenna configurations, is not limited to a specific specification. For example, the wireless communication system may be a single-end system or a differential system. By using a CGLNA which is compatible with both settings, chip size and hardware cost can be effectively reduced without reducing the flexibility compared with the conventional design.

In particular, it is envisaged that the aforementioned inventive concept can be applied by a semiconductor manufacturer to any integrated circuit. It is further envisaged that a semiconductor manufacturer may employ the inventive concept in the design of a stand-alone device, or application-specific integrated circuit (ASIC) and/or any other subsystem element.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Thus, an improved front-end circuit for a wireless communication system compatible with single/multiple antenna configurations, and wireless communication systems thereof, have been described, wherein the aforementioned disadvantages with prior art arrangements have been substantially alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A front-end circuit for a wireless communication system, comprising:
   a first amplifier, disposed at a receiving path, wherein the first amplifier has an input terminal and an output terminal, and the input terminal of the first amplifier is coupled to a first pad;
   a second amplifier, disposed at a transmission path, wherein the second amplifier has an input terminal and an output terminal, and the output terminal of the second amplifier is coupled to a second pad different from the first pad; and
   an antenna switch, coupled between the input terminal of the first amplifier and the output terminal of the second amplifier;
   wherein the front-end circuit is capable of operating at a single antenna mode and a multi-antenna mode, the multi-antenna mode involves at least two distinct antennas, at least one of the antennas is coupled to the first amplifier for receiving, the other one of the antennas is coupled to the second amplifier for transmission, and the antenna switch is selectively switched on according to the mode in which the front-end circuit operates;

wherein when the front-end circuit operates at the single antenna mode and receives data, the antenna switch switches on to couple the input terminal of the first amplifier to the output terminal of the second amplifier, and the second amplifier is turned off;

wherein when the front-end circuit operates at the multi-antenna mode, the antenna switch switches off to disconnect the input terminal of the first amplifier to the output terminal of the second amplifier.

2. The front-end circuit of claim 1, wherein the first amplifier is a common-gate low-noise amplifier, and the input terminal of the first amplifier is a source terminal of the common-gate low-noise amplifier, and the output terminal of the first amplifier is a drain terminal of the common-gate low-noise amplifier.

3. A wireless communication system, comprising:
the front-end circuit of claim 1, wherein the front-end circuit is integrated in a chip and operates at the single antenna mode; and
an external antenna, disposed outside of the chip and coupled to the second pad of the front-end circuit.

4. The wireless communication system of claim 3, wherein the first amplifier of the front-end circuit is a common-gate low-noise amplifier, the input terminal of the first amplifier is a source terminal of the common-gate low-noise amplifier.

5. The wireless communication system of claim 3, further comprising:
an external amplifier, disposed outside of the chip and coupled between the front-end circuit and the external antenna.

6. A wireless communication system, comprising:
the front-end circuit of claim 1, wherein the front-end circuit is integrated in a chip and operates at the multi-antenna mode;
an external receiving antenna, disposed outside of the chip and coupled to the first pad of the front-end circuit; and
an external transmission antenna, disposed outside of the chip and coupled to the second pad of the front-end circuit.

7. The wireless communication system of claim 6, wherein the first amplifier of the front-end circuit is a common-gate low-noise amplifier, the input terminal of the first amplifier is a source terminal of the common-gate low-noise amplifier, and the output terminal of the first amplifier is a drain terminal of the common-gate low-noise amplifier.

8. The wireless communication system of claim 6, further comprising:
an external amplifier, disposed outside of the chip and coupled between the front-end circuit and the external transmission antenna.

9. The wireless communication system of claim 6, further comprising:
an external amplifier, disposed outside of the chip and coupled between the front-end circuit and the external receiving antenna.

* * * * *